United States Patent
Aizono

(10) Patent No.: US 12,107,998 B2
(45) Date of Patent: Oct. 1, 2024

(54) IMAGE FORMING APPARATUS THAT PERFORMS ADJUSTMENT FOR POST PROCESSING ON A PRINTED MATERIAL, CONTROL METHOD THEREOF, AND STORAGE MEDIUM

(71) Applicant: CANON KABUSHIKI KAISHA, Tokyo (JP)

(72) Inventor: Keisuke Aizono, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/490,128

(22) Filed: Oct. 19, 2023

(65) Prior Publication Data

US 2024/0146849 A1 May 2, 2024

(30) Foreign Application Priority Data

Oct. 26, 2022 (JP) .................................. 2022-171583

(51) Int. Cl.
*H04N 1/00* (2006.01)
(52) U.S. Cl.
CPC ..... *H04N 1/00045* (2013.01); *H04N 1/00424* (2013.01); *H04N 1/00639* (2013.01)

(58) Field of Classification Search
None
See application file for complete search history.

(56) References Cited

U.S. PATENT DOCUMENTS

| | | | |
|---|---|---|---|
| 2009/0121407 A1* | 5/2009 | Kawamura | B65H 45/18 270/32 |
| 2019/0075206 A1* | 3/2019 | Tanigawa | B65H 45/18 |
| 2021/0289094 A1* | 9/2021 | Sawai | H04N 1/00785 |

FOREIGN PATENT DOCUMENTS

JP 2002012364 A 1/2002

* cited by examiner

*Primary Examiner* — Thomas D Lee
(74) *Attorney, Agent, or Firm* — ROSSI, KIMMS & McDOWELL LLP

(57) ABSTRACT

The present invention is directed to an image forming apparatus comprising determining whether printing of a test chart used in adjustment processing related to post processing is necessary in accordance with a predetermined setting status; and executing the adjustment processing using the test chart output as a result of printing and the post processing on the test chart in a case where the printing of the test chart is determined to be necessary, and executing the adjustment processing using a printed material that has already been printed and subjected to the post processing, in a case where the printing of the test chart is determined to be unnecessary.

16 Claims, 16 Drawing Sheets

SADDLE STITCHING

FOLDING

6041

SETTING

OUTPUTTING TEST CHART
(WILL PRINT AND EXECUTE POST PROCESSING)

6051

SETTING

SELECT SAME PAPER FEED LOCATION AS
ACTUALLY OUTPUT PAPER TO BE ADJUSTED

6052

CANCEL      NEXT 6054      6053

IMAGE FORMING APPARATUS THAT PERFORMS ADJUSTMENT FOR POST PROCESSING ON A PRINTED MATERIAL, CONTROL METHOD THEREOF, AND STORAGE MEDIUM

BACKGROUND OF THE INVENTION

Field of the Invention

The present invention relates to an image forming apparatus, a control method thereof, and a storage medium.

Description of the Related Art

Some image forming apparatuses are connected to a finisher that performs processing such as stapling, folding, and punching on sheets to be output. In such an image forming apparatus, settings related to post processing to be performed on a sheet to be output can be made in accordance with a user input using an operation panel on a main body. For example, an adjustment value input screen for finely adjusting the stapling position of the stapler and the folding position is displayed on the operation panel, and the finishing position can be adjusted based on the setting made by the user.

Japanese Patent Laid-Open No. 2002-12364 proposes a method in which an image of a test chart for adjustment is held in advance in a storage unit of an image forming apparatus, and at the time of adjustment for a folding position, the image of the test chart is printed, folding is performed as the post processing, and the test chart is output, to enable a displacement amount of the folding position to be easily confirmed. The adjustment can be easily performed by using the test chart as described above.

However, the conventional technology described above has a problem described below. When the test chart is printed in a series of adjustment procedures, the test chart may be printed wastefully. For example, when a demand for positional adjustment arises as a result of one actual printing, it is possible to determine the position displacement by using the printed material, which has been output, meaning that the test chart does not need to be printed. In such a case, the user only has to adjust the adjustment value using the printed material that has already been output, meaning that if the test chart is newly output in the adjustment procedure, sheet, toner, needle, and the like are wastefully consumed.

SUMMARY OF THE INVENTION

The present invention enables realization of a mechanism for favorably outputting, when performing adjustment for post processing on a printed material, a printed material for the adjustment as necessary.

One aspect of the present invention provides an image forming apparatus comprising: at least one memory device that stores a set of instructions; and at least one processor that executes the set of instructions to determine whether printing of a test chart used in adjustment processing related to post processing is necessary in accordance with a predetermined setting status; and execute the adjustment processing using the test chart output as a result of printing and the post processing on the test chart in a case where the printing of the test chart is determined to be necessary, and execute the adjustment processing using a printed material that has already been printed and subjected to the post processing, in a case where the printing of the test chart is determined to be unnecessary.

Another aspect of the present invention provides a control method for an image forming apparatus, the control method comprising: determining whether printing of a test chart used in adjustment processing related to post processing is necessary in accordance with a predetermined setting status; and executing the adjustment processing using the test chart output as a result of printing and the post processing on the test chart in a case where the printing of the test chart is determined to be necessary, and executing the adjustment processing using a printed material that has already been printed and subjected to the post processing, in a case where the printing of the test chart is determined to be unnecessary.

Still another aspect of the present invention provides a non-transitory computer-readable storage medium storing a computer program for causing a computer to execute each step of a control method for an image forming apparatus, the control method comprising: determining whether printing of a test chart used in adjustment processing related to post processing is necessary in accordance with a predetermined setting status; and executing the adjustment processing using the test chart output as a result of printing and the post processing on the test chart in a case where the printing of the test chart is determined to be necessary, and executing the adjustment processing using a printed material that has already been printed and subjected to the post processing, in a case where the printing of the test chart is determined to be unnecessary.

Further features of the present invention will be apparent from the following description of exemplary embodiments with reference to the attached drawings.

DESCRIPTION OF THE EMBODIMENTS

Figure 1:
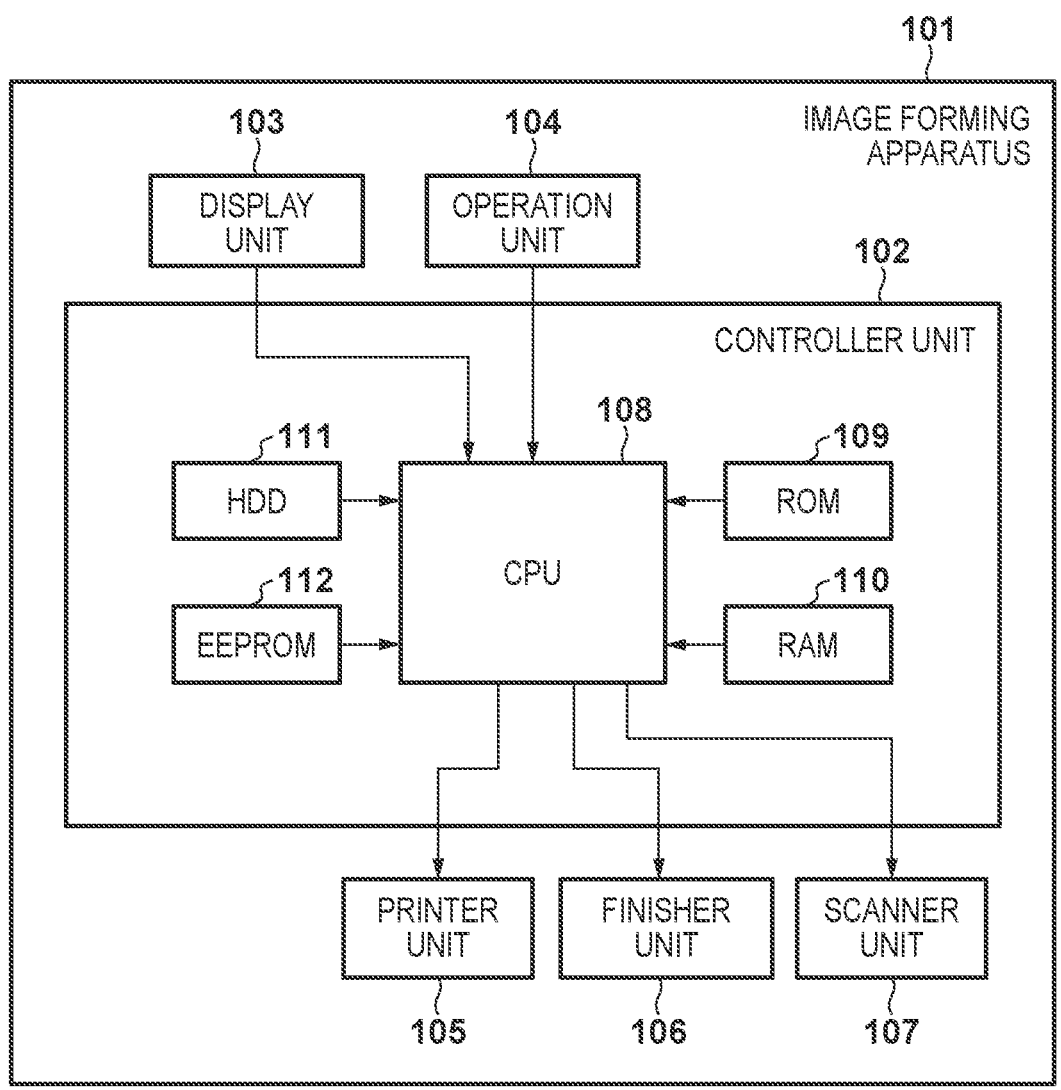
FIG. 1 is diagram illustrating an overall configuration of a system.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

System Arrangement

Embodiments of the present invention will be described below. First, a configuration example of an image forming system according to the present embodiment will be described with reference to FIG. 1. The present invention is applicable to an image forming system (image forming apparatus) including a multi-color copying machine or a multifunction peripheral (MFP). In the embodiment described below, an MFP having a scan function, a print function, a copy function, a transmission function, and the like will be described as an example of an image forming apparatus to which the present invention is applied. In addition, an MFP that can form a multicolor image on a recording material using color materials (toner or the like) of a plurality of colors (four colors of cyan (C), magenta (M), yellow (Y), and black (K)) will be described as an example.

An image forming apparatus 101 includes a controller unit 102, a display unit 103, an operation unit 104, a printer unit 105, a finisher unit 106, and a scanner unit 107. The display unit 103 includes an LED and a liquid crystal display, and displays operation contents of a user and internal information of the apparatus. The operation unit 104 receives an operation from the user. Further, the operation unit 104 may be realized as a touch panel display together with the display unit 103, in addition to including a plurality of operation buttons. The printer unit 105 accepts a print instruction from the controller unit 102, and prints image data received from the controller unit 102 on a sheet. The finisher unit 106 accepts an instruction from the controller unit 102 and performs post processing such as stapling using a stapler or folding on a printed sheet. The scanner unit 107 accepts a reading instruction from the controller unit 102, performs a reading operation, and transmits the acquired image data to the controller unit 102. Modes for the reading operation include a fixed-reading mode under which a document placed on a glass platen is read, and an automatic document feeder (ADF) mode under which an original document is read while being conveyed by an ADF.

The controller unit 102 includes a CPU 108, a ROM 109, a RAM 110, an HDD 111, and an EEPROM 112. The CPU 108 is an execution medium of a control program incorporated in the image forming apparatus 101, and controls operations of apparatuses connected to the controller unit 102 via, for example, each OF and a memory of a storage medium and the like. The read-only memory (ROM) 109 stores a boot program and the like necessary for starting the system. The random access memory (RAM) 110 is a volatile memory and is a work memory required to execute a control program. The hard disk drive (HDD) 111 is a storage medium, such as a magnetic disk, and stores a control program, image data, and the like. The electrically erasable programmable ROM (EEPROM) 112 is a non-volatile memory and stores, for example, setting values required when the control program is executed and the like. The EEPROM 112 also stores a folding position adjustment value and a stapling position adjustment value to be notified from the controller unit 102 to the finisher unit 106 during post processing.

Configuration of Image Forming Apparatus

Figure 2:
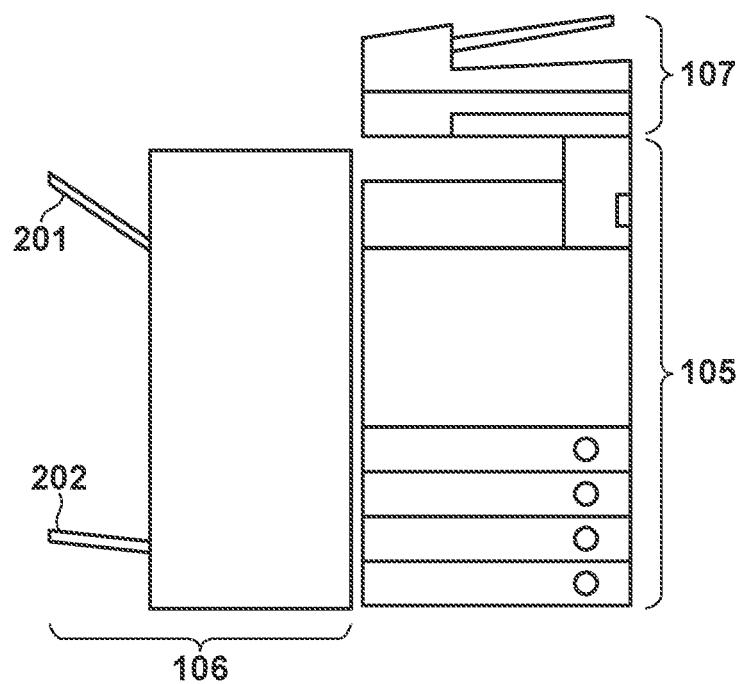
FIG. 2 is a diagram illustrating an outer view of an image forming apparatus.

An example of a configuration of the image forming apparatus 101 according to the present embodiment will be described with reference to FIG. 2. The printer unit 105 has a plurality of sheet feeding units, and has the scanner unit 107 disposed in an upper portion. At least one of paper discharge ports of the printer unit 105 is connected to a paper feed port of the finisher unit 106. When post processing is performed on a sheet printed by the printer unit 105, the printed sheet is conveyed from the printer unit 105 to the finisher unit 106 where the post processing is performed, and discharged from a sheet discharge unit 201 or a sheet discharge unit 202. When post processing such as saddle stitching or folding, which will be described later, is performed, the printed sheet is discharged from the sheet discharge unit 202. The printed sheet may be directly discharged without the post processing. In such a case, the printed sheet is discharged from the sheet discharge unit 201.

Post Processing

Figure 3:
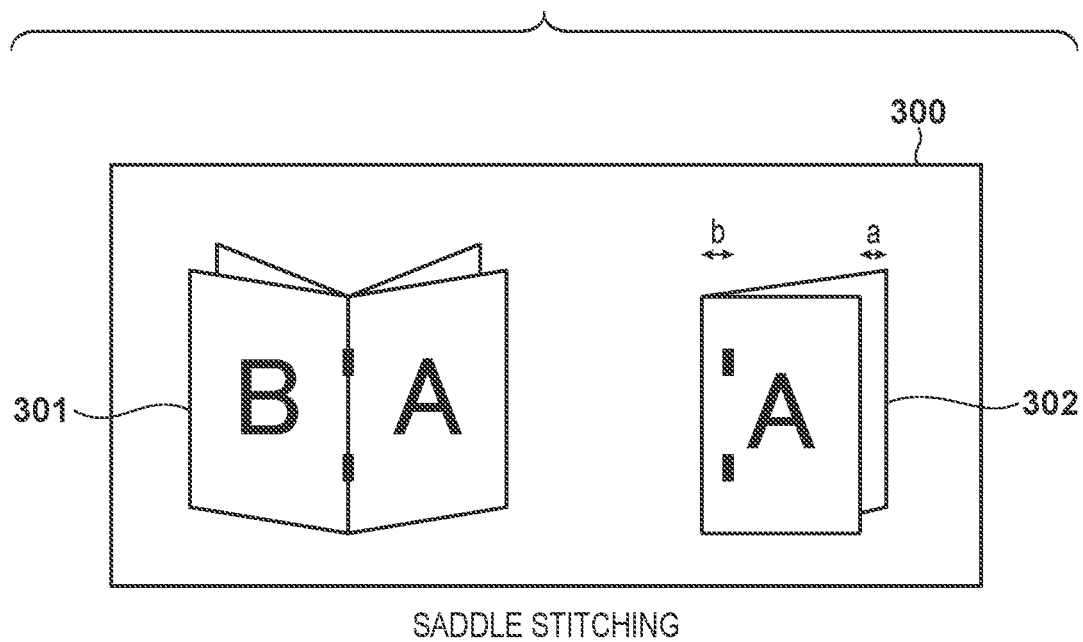
FIG. 3 is a diagram illustrating a test chart for saddle stitching and folding.
Figure 3:
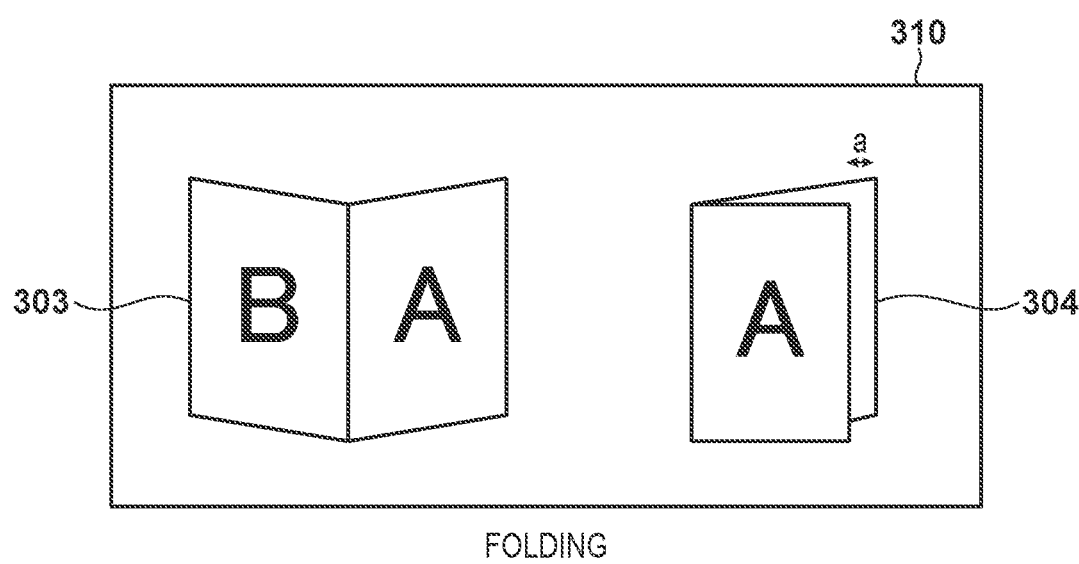

The post processing such as saddle stitching and folding will be described with reference to FIG. 3. Reference numeral 300 denotes saddle stitching processing, and reference numeral 310 denotes folding processing. Note that while the saddle stitching processing and the folding processing are described here as examples of the post processing, the present invention is not intended to be limited thereto, and the present invention can be applied to any other post processing.

Reference numerals 301 and 302 denote states as a result of the saddle stitching on the printed sheet. With the saddle stitching, a plurality of printed sheets are folded at the center and then stapled at the center. The actual output may have displacement from the intended desirable state expressed as a=0 and b=0, where a represents the amount of leftward/rightward displacement and b represents the amount of displacement between the folding position and the stapling position. In this case, the user adjusts the displacement amount by changing the setting.

Reference numerals 303 and 304 denote states as a result of the folding on the printed sheet. With the folding, one or more printed sheets are collectively folded at the center. The actual output may have displacement from the intended desirable state expressed as a=0, where a represents the amount of leftward/rightward displacement of the fold. In this case, the user adjusts the displacement amount by changing the setting. How the adjustment for the displacement amount is performed will be described in detailed later.

Job Setting Screen

Figure 4A:
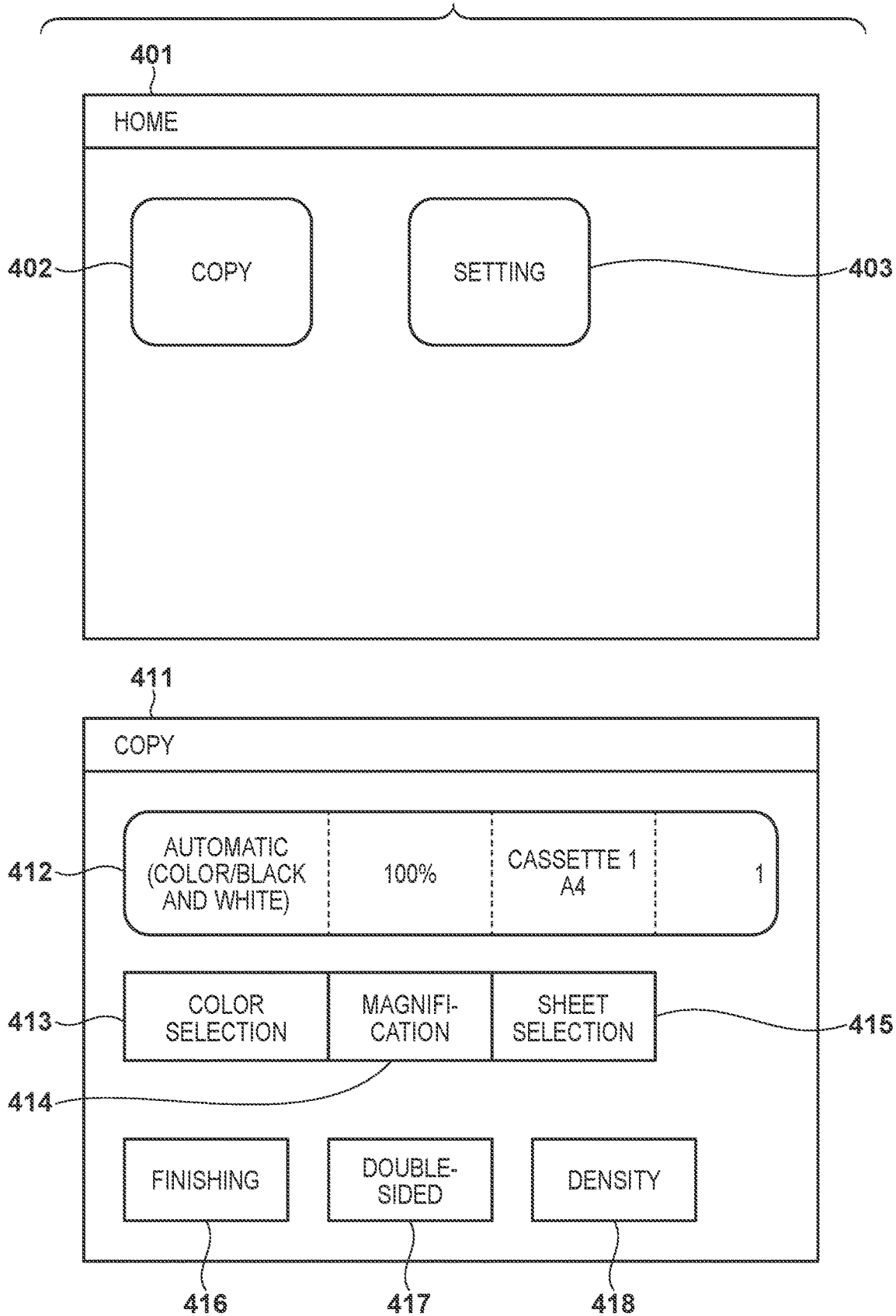
FIG. 4A is a diagram illustrating an example of a setting screen.
Figure 4B:
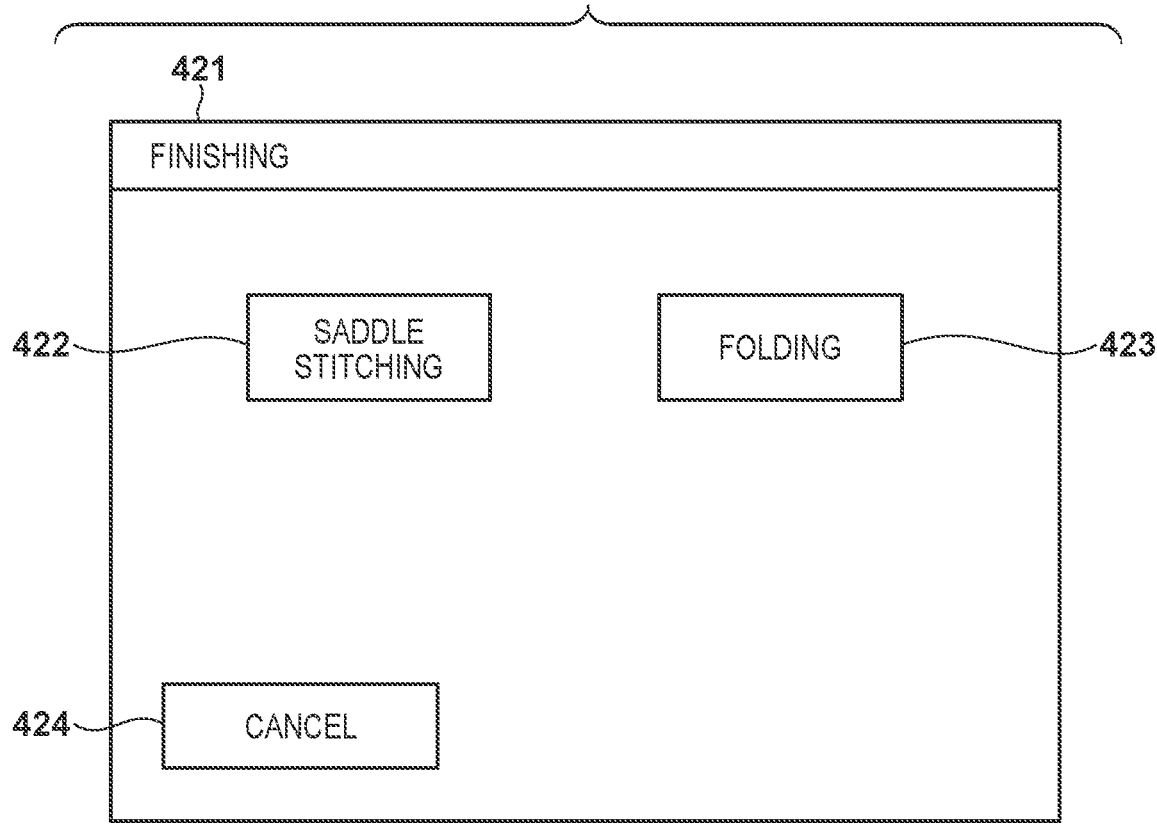
FIG. 4B is a diagram illustrating an example of a setting screen.
Figure 4B:
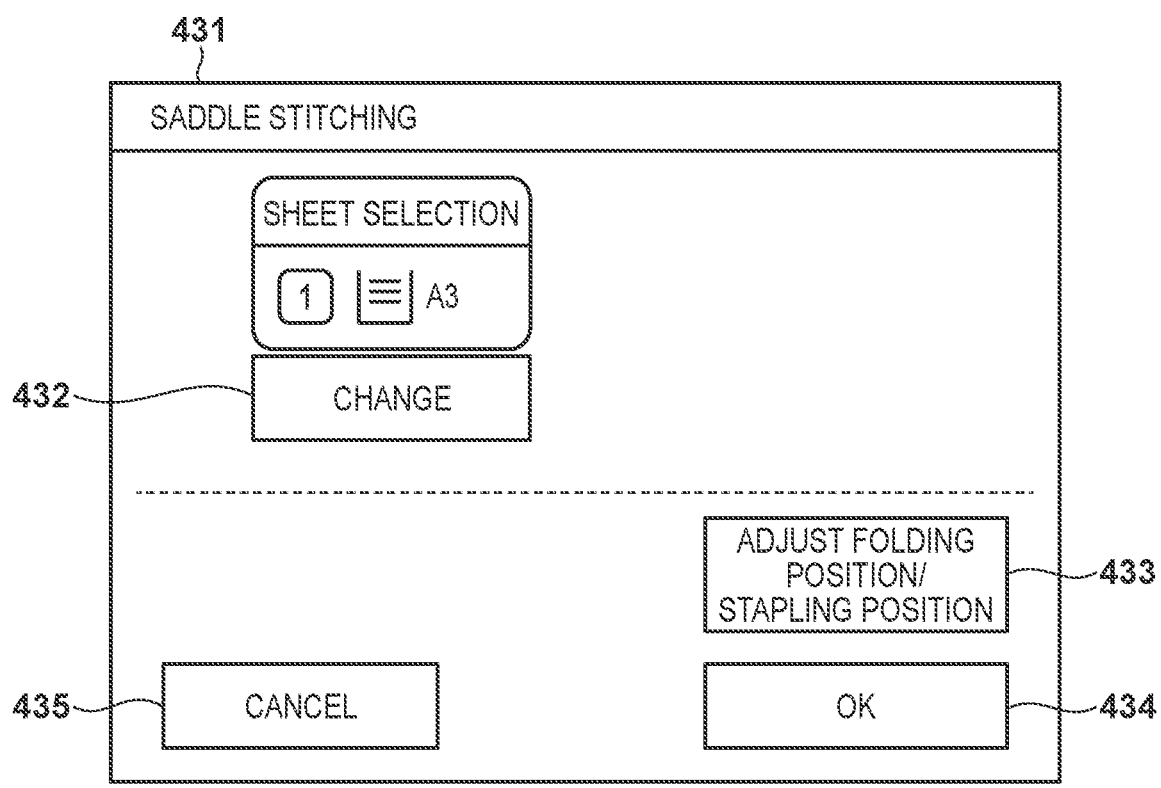
Figure 4C:
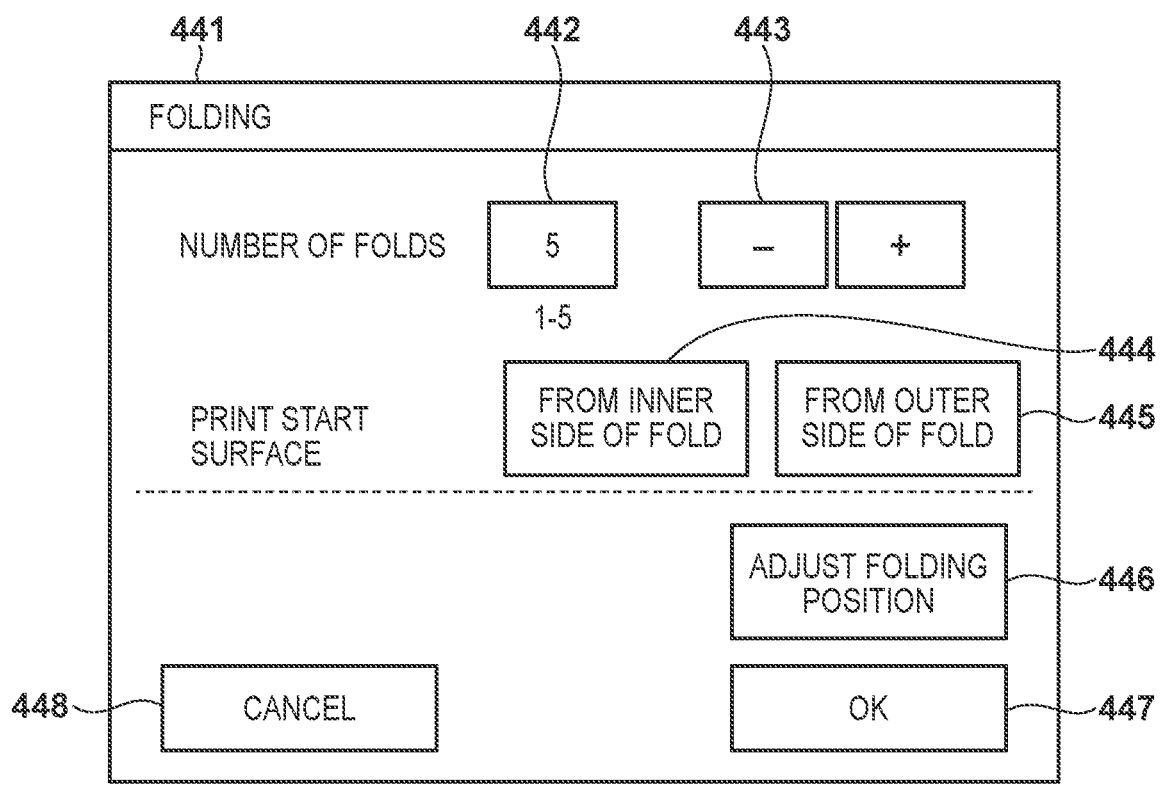
FIG. 4C is a diagram illustrating an example of a setting screen.

With reference to FIG. 4A to FIG. 4C, a setting method for the saddle stitching processing and the folding processing in the setting of a copy job according to the present embodiment will be described with reference to the drawings. Screen illustrated in FIG. 4A to FIG. 4C are displayed on the display unit 103 of the image forming apparatus 101 by the CPU 108 functioning as a display control unit. Alternatively, information on the screens may be provided to an external apparatus communicably connected, and the screens may be displayed on a display unit of the external apparatus. When the user operates an object such as a button displayed on each screen, the object may be operated using the operation unit 104, or if the display unit 103 is realized by a touch panel display, the object may be operated through direct touching on the screen.

Reference numeral 401 in FIG. 4A denotes an example of a home screen. The home screen 401 includes a copy icon 402 and a setting icon 403. When the user selects the copy icon 402, a copy setting screen is displayed. The setting icon 403 will be described later. If the image forming apparatus 101 has a function other than copying, an icon corresponding to such a function may be displayed.

Reference numeral 411 in FIG. 4A denotes an example of the copy setting screen. The copy setting screen 411 includes a setting display 412, a color selection button 413, a magnification button 414, a sheet selection button 415, a finishing button 416, a double-sided button 417, and a density button 418. The setting display 412 displays the content currently set. The color selection button 413 is used to designate color selection of a printed material. The magnification button 414 is used to designate a magnification of a printed material based on the original document. The sheet selection button 415 is used for designating the source of the sheet to be printed. The finishing button 416 is used for designating finishing including post processing for the printed material. The double-sided button 417 is used for designating whether to perform double-sided printing on the printed material. The density button 418 is used for designating a density for the printing on the printed material. On detail setting screens corresponding to the buttons 413 to 418, numerical value inputs and options may be displayed within a range providable by the image forming apparatus 101. Further setting buttons may be provided.

A case where the finishing button 416 is selected on the copy setting screen 411 will be described. When the user selects the finishing button 416, a finishing setting screen 421 illustrated in FIG. 4B is displayed on the display unit 103. The finishing setting screen 421 includes a saddle stitching button 422, a folding button 423, and a cancel button 424. When the user selects the saddle stitching button 422, a saddle stitching setting screen is displayed. When the user selects the folding button 423, a folding setting screen is displayed. When the user selects the cancel button 424, the finishing setting is canceled and the screen returns to the copy setting screen 411.

Reference numeral 431 in FIG. 4B denotes an example of the saddle stitching setting screen. The saddle stitching setting screen 431 includes a sheet selection button 432, a folding position/stapling position adjustment button 433, an OK button 434, and a cancel button 435. The sheet selection button 432 is used for changing the source of the set sheet that is the target of the saddle stitching. The folding position/stapling position adjustment button 433 is used for adjusting the displacement amounts "a" or "b" illustrated in 302. A specific method for the adjustment will be described later with reference to FIG. 6. The OK button 434 is used for confirming the saddle stitching setting. When the user selects the OK button 434, sheet selection information is stored in the RAM 110 as the job setting information together with the information indicating that the saddle stitching is set, and the screen returns to the copy setting screen 411. The cancel button 435 is used for canceling the saddle stitching setting. When the user selects the cancel button 435, the saddle stitching setting information stored in the RAM 110 is deleted, and the screen returns to the copy setting screen 411. While the sheet selection is described as an example of the saddle stitching setting information, a setting button for bookbinding imposition or the like may be provided.

Reference numeral 441 in FIG. 4C denotes an example of the folding setting screen. The folding setting screen 441 includes a folded sheet count 442, a +/− button 443, a "from inner side of fold" button 444, a "from outer side of fold" button 445, a folding position adjustment button 446, an OK button 447, and a cancel button 448. The folded sheet count 442 is used for setting the number of sheets to be folded in each bundle when a plurality of printed sheets are printed. For example, when the number of printed sheets is 10 and the folded sheet count is 5, 2 bundles each including 5 folded sheets are output. The +/− button 443 is used for changing the value of the folded sheet count 442. The "from inner side of fold" button 444 and the "from outer side of fold" button 445 are used for designating the inside or the outside with respect to the fold as the print start surface. The folding position adjustment button 446 is used for adjusting the displacement amount of a illustrated in 304. A specific method for the adjustment will be described later with reference to FIG. 6. The OK button 447 is used for confirming the folding setting. When the user selects the OK button 447, the information indicating that the fold setting is set as well as the information on the folded sheet count and the print start surface information are stored in the RAM 110 as the job setting information, and the screen returns to the copy setting screen 411. The cancel button 448 is used for canceling the folding setting. When the user selects the cancel button 448, the folding setting information stored in the RAM 110 is deleted, and the screen returns to the copy setting screen 411. The method for the saddle stitching and folding setting in a copy job is as described above.

Processing Procedure for Copy Job

Figure 5:
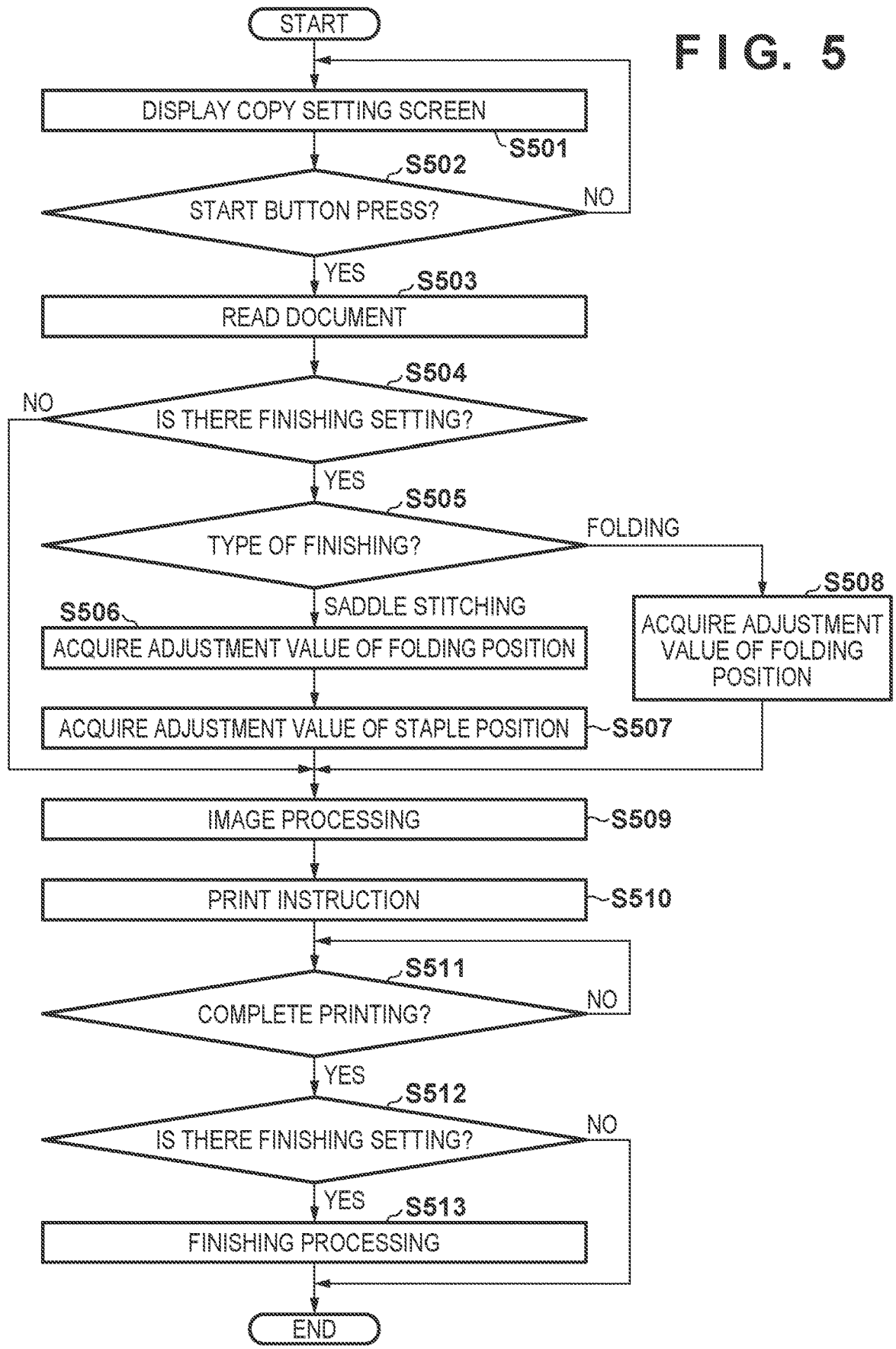
FIG. 5 is a flowchart illustrating a procedure for processing a copy job.

Next, a processing procedure for a copy job according to the present embodiment will be described with reference to FIG. 5. The processing described below is executed, for example, by the CPU 108 loading a control program stored in the ROM 109, the HDD 111, and the EEPROM 112 onto the RAM 110 and executing it. The processing is executed when the CPU 108 displays 401 in FIG. 4A on the display unit 103, and the selection of the copy icon 402 using the operation unit 104 is detected. Here, a description will be given on a processing procedure for executing a job including post processing performed with a folding position and a stapling position, which are processing positions related to the post processing, adjusted using an adjustment value set in advance by adjustment processing or the like described later with reference to FIG. 7 in a copy job. While a copy job will be described herein as an example, this is not intended to limit the present invention, and any other job involving post processing, such as a print job, may be applied.

In S501, the CPU 108 displays the copy setting screen 411 on the display unit 103, and accepts job setting. Next, in S502, the CPU 108 determines whether a start button provided on the operation unit 104 is selected. Until the start button is selected, the job setting acceptance continues in S501. When it is determined that the start button is selected, the CPU 108 instructs the scanner unit 107 to read an original document in S503.

When the reading of the original document by the scanner unit is completed, in S504, the CPU 108 determines whether the RAM 110 includes the finishing setting information (setting information related to the post processing) as the job setting. When the finishing (post processing) is not set, the processing proceeds to S509. When the finishing is set, the processing proceeds to S505. In S505, the CPU 108 determines the type of the finishing. Here, in order to simplify the description, a case where two types of post processing that are the saddle stitching processing and the folding processing, are settable as the finishing (post processing) will be described. As described above, the post processing may include any other type of post processing.

When it is determined that the saddle stitching is set as the finish setting, the CPU 108 acquires the adjustment value of the folding position and the adjustment value of the stapling position for saddle stitching held in the EEPROM 112 in S506 and S507. Then, the processing proceeds to S509. On the other hand, when it is determined that the folding is set as the finish setting, the CPU 108 acquires the adjustment value of the folding position for the folding held in the EEPROM 112 in S508. Then, the processing proceeds to S509.

In S509, the CPU 108 executes image processing designated using the color selection button 413, the magnification button 414, the double-sided button 417, and the density button 418. Next, in S510, the CPU 108 instructs the printer unit 105 to perform the printing, and notifies the finisher unit 106 of the adjustment values acquired in S506, S507, and S508, when the saddle stitching or folding is set. After the print instruction, the CPU 108 waits until the printing is completed in the S511. When the printing is completed, the processing proceeds to S512 where the CPU 108 determines whether the finishing setting (post processing setting) has been made for this job. When the post processing is not to be performed, the processing in this flowchart ends. On the other hand, when the post processing is to be performed, the processing proceeds to S513 where the CPU 108 causes the finisher unit 106 to execute the post processing set for the job. Then, the processing in this flowchart ends. Further, the finisher unit 106 executes the post processing in accordance with the notified adjustment value.

Post Processing Adjustment Method (Adjustment Screen)

Next, an adjustment method for the saddle stitching processing and the folding processing will be described with reference to example adjustment screens illustrated in FIG. 6. Screens illustrated in FIG. 6A to FIG. 6F are displayed on the display unit 103 of the image forming apparatus 101 by the CPU 108 functioning as a display control unit. Alternatively, information on the screens may be provided to an external apparatus communicably connected, and the screens may be displayed on a display unit of the external apparatus. When the user operates an object such as a button displayed on each screen, the object may be operated using the operation unit 104, or if the display unit 103 is realized by a touch panel display, the object may be operated through direct touching on the screen.

There is a plurality of triggering patterns for starting adjustment for the saddle stitching or the folding. In one case, the folding position/stapling position adjustment button 433 on the saddle stitching setting screen 431 is selected. In another case, the folding position adjustment button 446 on the folding setting screen 441 is selected. The adjustment may be started on a setting menu screen 6001 illustrated in FIG. 6A. Here, a description is given on a case in which a test chart is printed out and a processing position of post processing such as a folding position and a stapling position is adjusted so as to eliminate a displacement from the processing position related to the post processing, and a case in which the adjustment is performed using a printed material that has already been output. The adjustment using the printed material already output is performed with the printed material output in accordance with the flowchart illustrated in FIG. 5 for example. For example, the user may check the printed material and desire to further adjust the processing position of the post processing such as the folding position and the stapling position to eliminate the displacement from the processing position related to the post processing.

The setting menu screen 6001 is displayed on the display unit 103 when the setting icon 403 on the home screen 401 is selected. The setting menu screen 6001 includes a "saddle stitching-folding position/stapling position adjustment" button 6002, a "folding position adjustment" button 6003, and a close button 6004. The close button 6004 is used for terminating the setting. When the user selects the close button 6004, the screen returns to the home screen 401. When the "saddle stitching-folding position/stapling position adjustment" button 6002 is selected, the adjustment is started as in the case where the folding position/stapling position adjustment button 433 is selected, and the screen transitions to a saddle stitching adjustment procedure screen 6011 illustrated in FIG. 6A. When the "folding position adjustment" button 6003 is selected, the adjustment starts as in the case where the folding position adjustment button 446 is selected, and the screen transitions to a folding adjustment procedure screen 6021 illustrated in FIG. 6B.

Hereinafter, screen transition will be described using four cases of saddle stitching adjustment using a test chart, saddle stitching adjustment using an actually printed material, folding adjustment using a test chart, and folding adjustment using an actually printed material as examples. Here, "adjustment using a test chart" indicates that a test chart is printed and various adjustments are performed using a read image acquired by reading the printed test chart. This means that printing for adjustment is additionally performed in the adjustment processing. Furthermore, "adjustment using an actually printed material" indicates that various adjustments are performed using a read image acquired by reading an already printed material. This means that no printing for adjustment is additionally performed in the adjustment processing.

Saddle Stitching Adjustment Using Test Chart

First, screen transition in the case of the saddle stitching adjustment using a test chart will be described. To perform the saddle stitching adjustment using the test chart, the user sets an "adjustment using actually printed material" button 6012 to OFF and selects a next button 6013 on the saddle stitching adjustment procedure screen 6011 illustrated in FIG. 6A. On the saddle stitching adjustment procedure screen 6011 illustrated in FIG. 6A, the "adjustment using actually printed material" button (checkbox) 6012 is checked meaning that the setting is ON. Therefore, an operation is performed to remove the check. Each time the "adjustment using actually printed material" button (checkbox) 6012 is selected, ON/OFF is switched. On the screen of the present embodiment, "adjustment using actually printed material" is displayed. Alternatively, a message indicating an operation such as "skip test chart" may be displayed, and thus the message is not particularly limited.

Figure 6A:
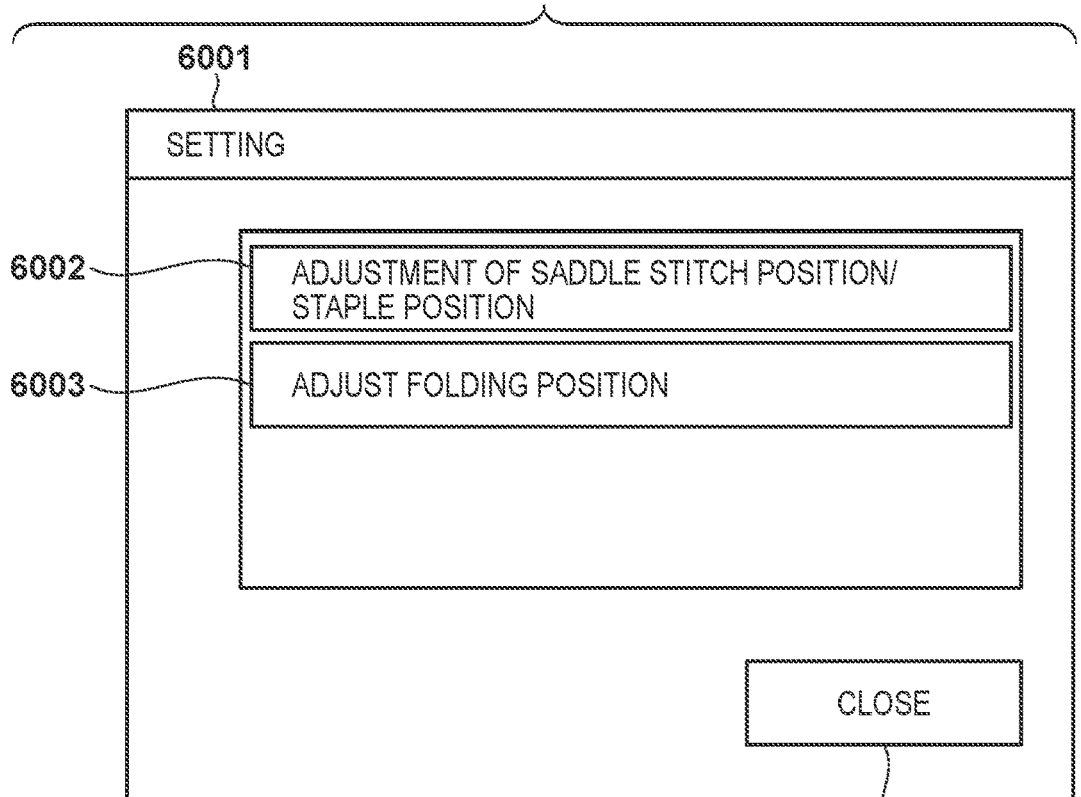
FIG. 6A is a diagram illustrating an example of a setting screen.
Figure 6A:
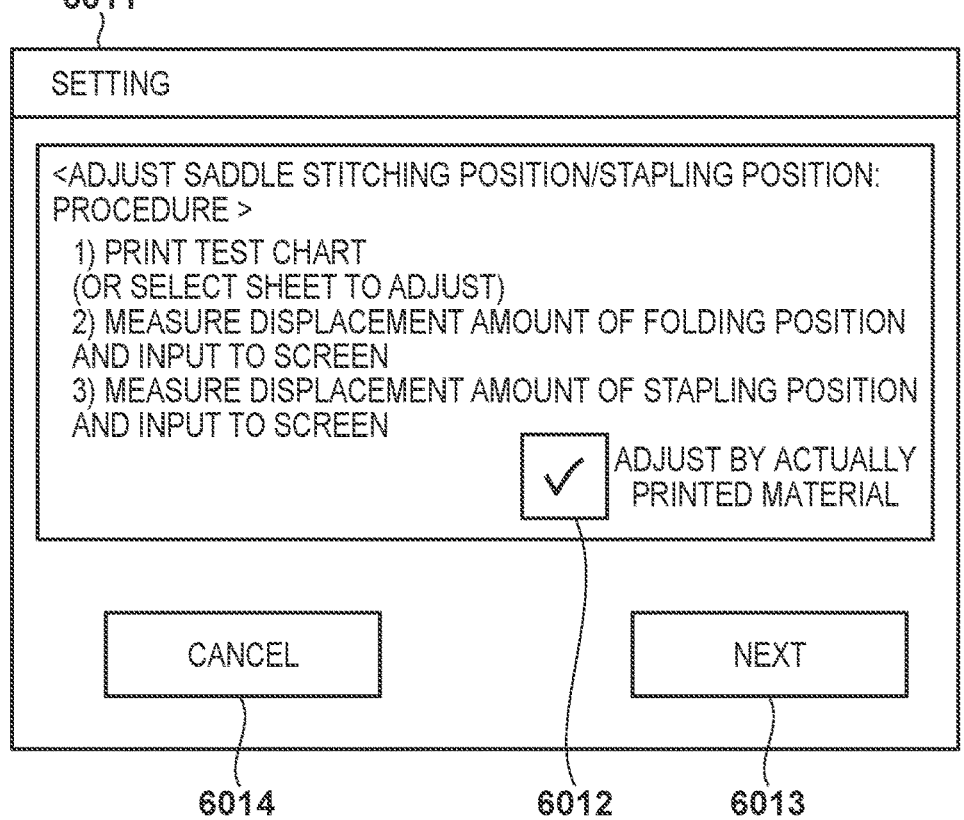
Figure 6B:
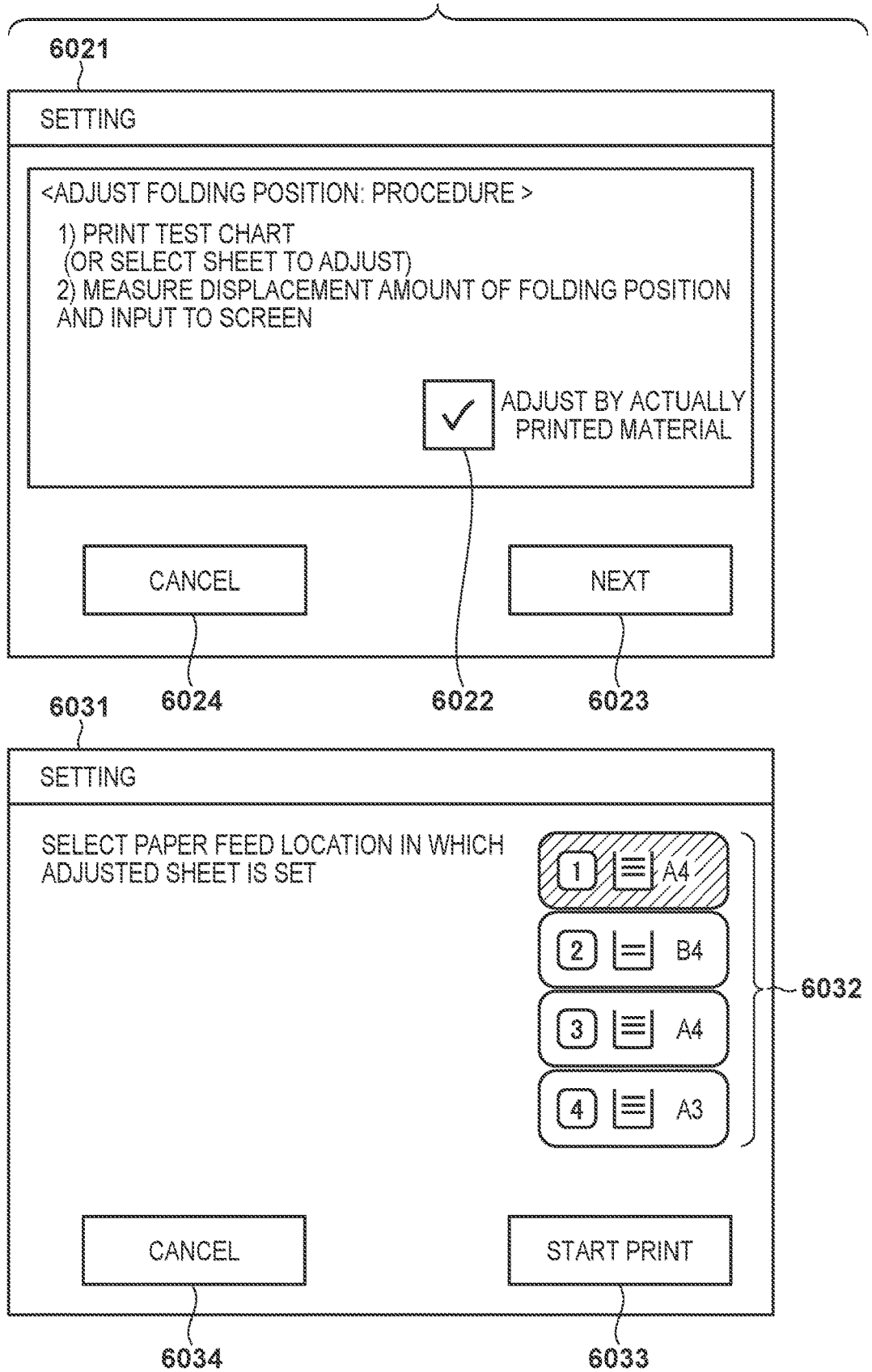
FIG. 6B is a diagram illustrating an example of a setting screen.
Figure 6C:
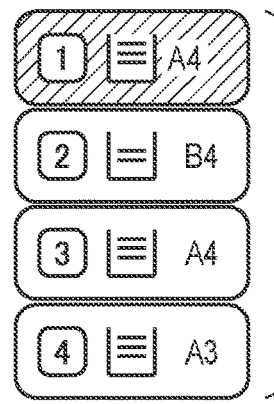
FIG. 6C is a diagram illustrating an example of a setting screen.

When the next button 6013 is selected, a test chart source selection screen 6031 illustrated in FIG. 6B is displayed on the display unit 103. The user selects the source where the sheet to be adjusted is set, using a fed sheet selection button 6032, and selects a print start button 6033. When the print start button 6033 is selected, printing of the test chart starts, and a test chart outputting screen 6041 illustrated in FIG. 6C is displayed on the display unit 103. When the printing of the test chart starts, post processing such as saddle stitching processing and folding processing is performed on the printed test chart. Specific contents of the test chart output will be described later with reference to FIG. 7.

When the output of the test chart is completed, the test chart folding position displacement amount input screen

Figure 6D:
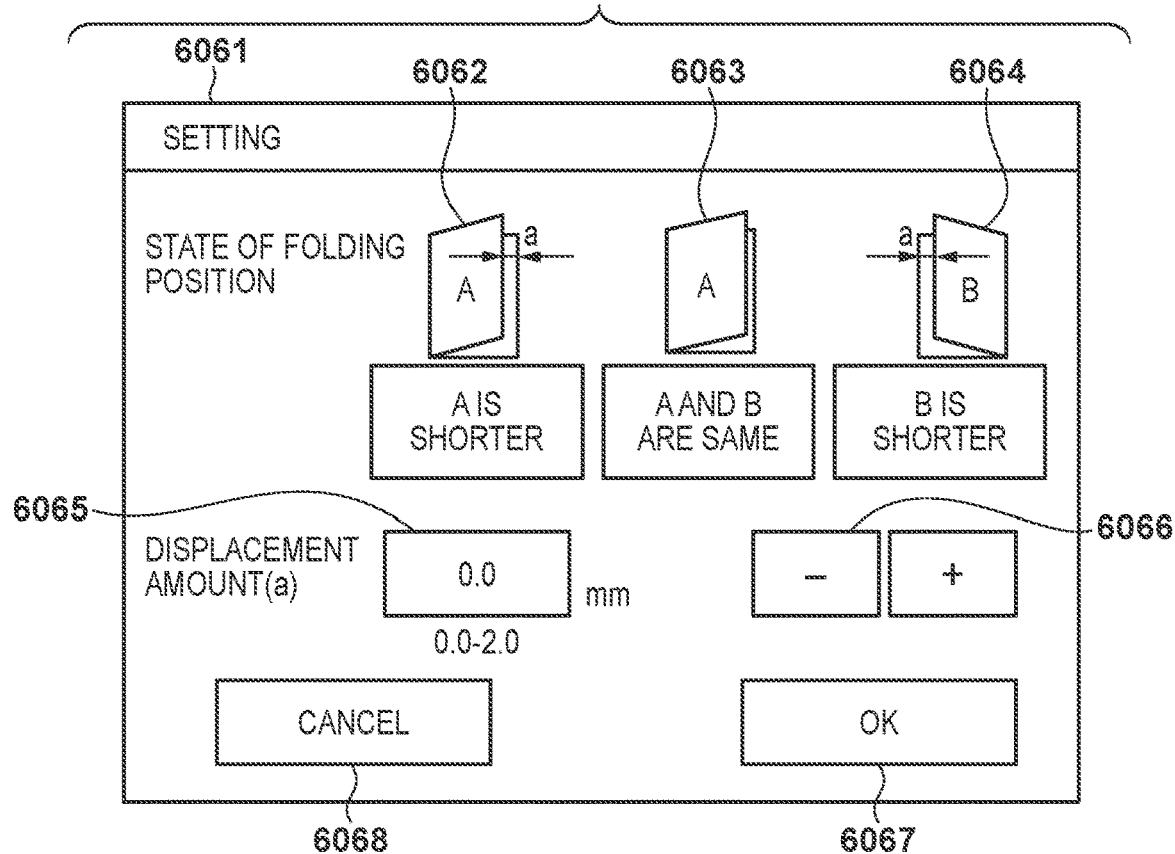
FIG. 6D is a diagram illustrating an example of a setting screen.
Figure 6D:
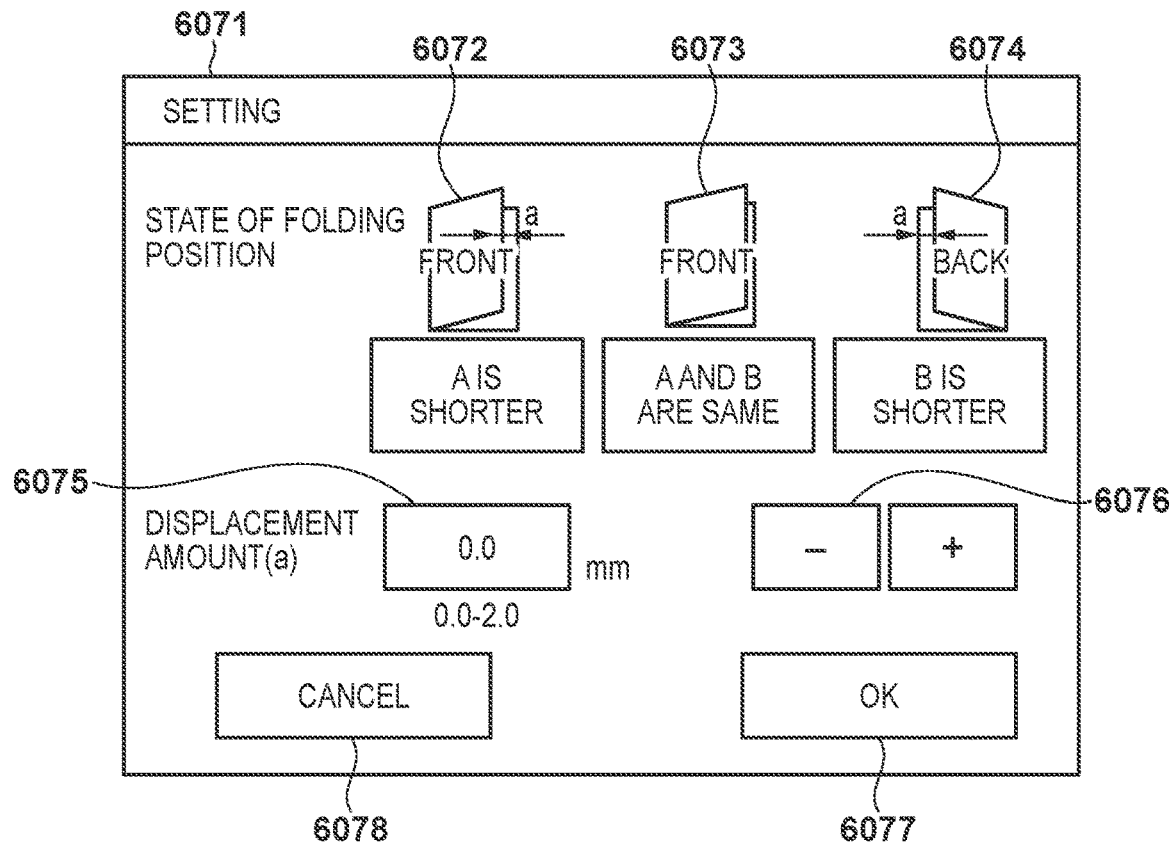
Figure 6E:
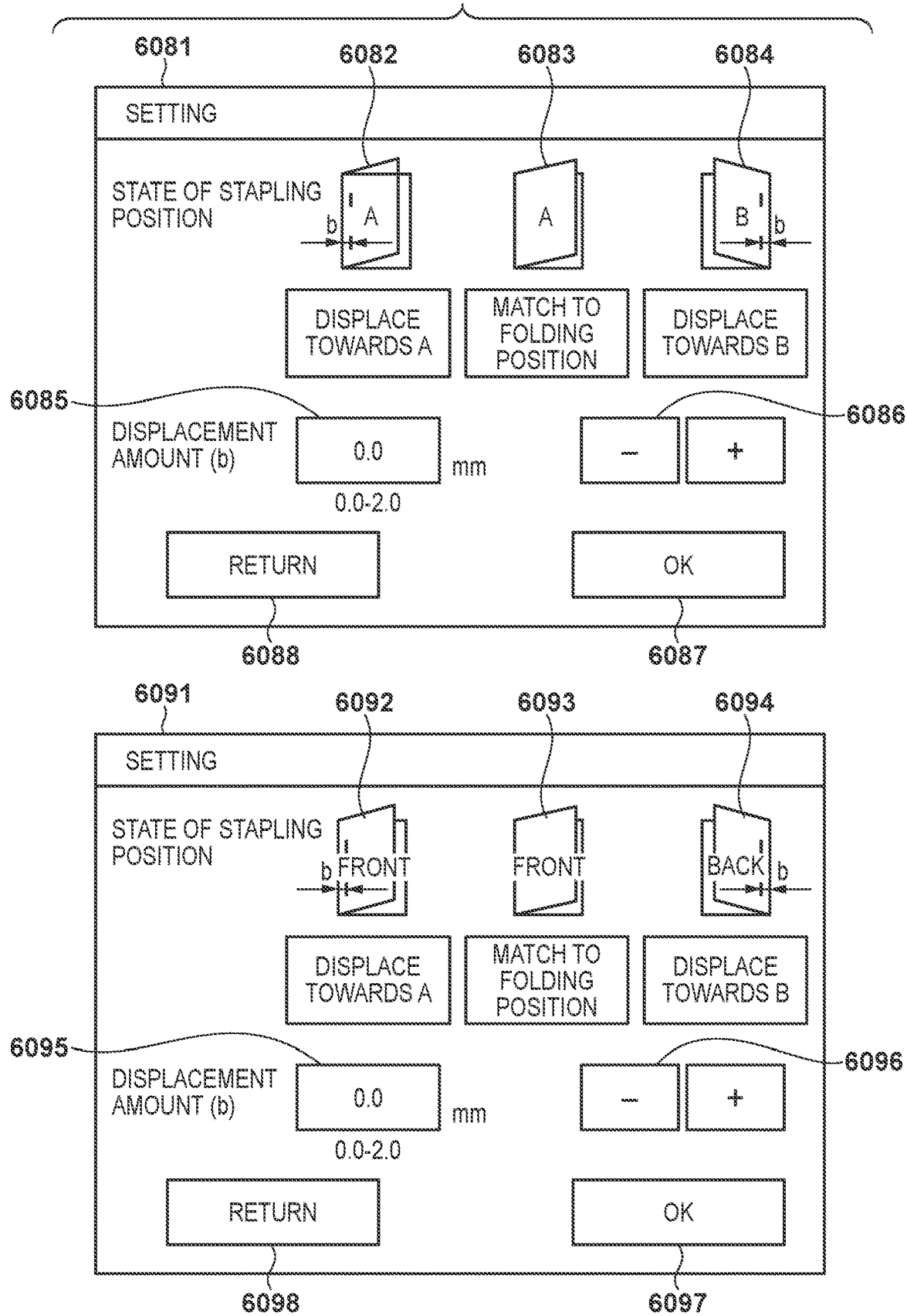
FIG. 6E is a diagram illustrating an example of a setting screen.
Figure 6F:
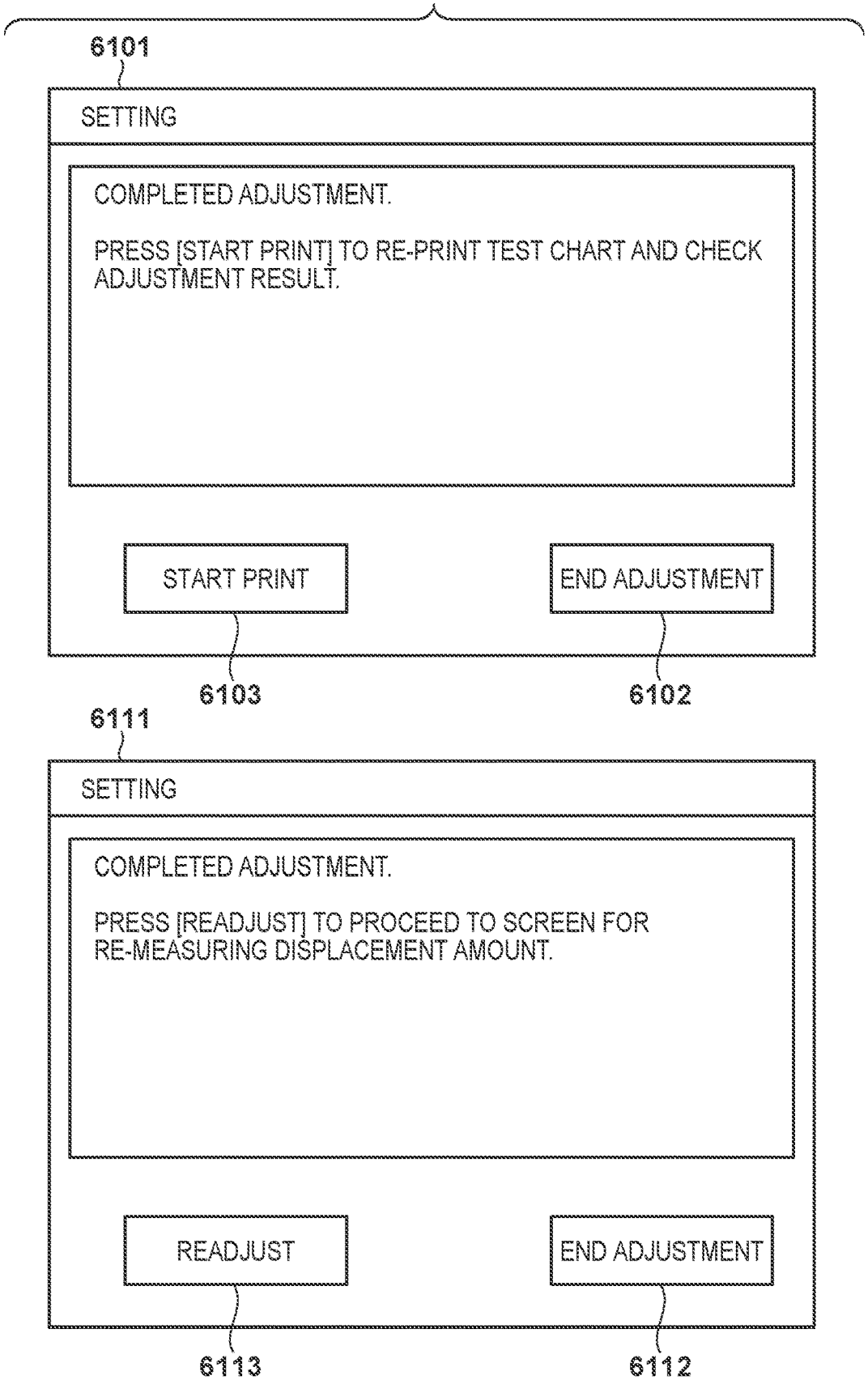
FIG. 6F is a diagram illustrating an example of a setting screen.

6061 FIG. 6D is displayed on the display unit 103. The user selects the state that is the same as that of the test chart output from states 6062, 6063, and 6064 of the folding position, uses a +/− button 6066 for a displacement amount 6065 of the folding position, and inputs the numerical value of the displacement amount a. When the user selects an OK button 6067 after inputting the displacement amount a, an input screen 6081 for the stapling position displacement amount for the test chart illustrated in FIG. 6E is displayed on the display unit 103. The user selects the state that is the same as that of the test chart output from states 6082, 6083, and 6084 of the stapling position, uses a +/− button 6086 for a displacement amount 6085 of the stapling position, and inputs the numerical value of the displacement amount b. When the user selects an OK button 6087 after the displacement amount b has been input, a test chart re-output confirmation screen 6101 illustrated in FIG. 6F is displayed on the display unit 103. When a return button 6088 is selected, the screen returns to a test chart folding position displacement amount input screen 6061 illustrated in FIG. 6D.

When the test chart is not to be re-output, the user selects an adjustment end button 6102 on the test chart re-output confirmation screen 6101 to complete the adjustment. When the test chart is to be re-output, a print start button 6103 is selected. When the print start button 6103 is selected, printing of the test chart starts, and a test chart outputting screen 6041 illustrated in FIG. 6C is displayed on the display unit 103. When the output of the test chart is completed, an adjustment value re-input confirmation screen 6111 illustrated in FIG. 6F is displayed on the display unit 103. When the readjustment is not to be performed, the user selects an adjustment end button 6112 to complete the adjustment. On the other hand, when the readjustment is to be performed, the user selects a readjustment button 6113. When the readjustment button 6113 is selected, the test chart folding position displacement amount input screen 6061 illustrated in FIG. 6D is displayed on the display unit 103. The subsequent screen transition is similar to that described above, and thus description thereof is omitted. Cancel buttons 6014, 6034, and 6068 on the respective screens are used for canceling the adjustment before the completion. The screen transition in the case of the saddle stitching adjustment using a test chart is as described above.

Saddle Stitching Adjustment Using Actually Printed Material

Next, screen transition in the case of the saddle stitching adjustment using an actually printed material will be described. To perform the saddle stitching using an actually printed material, the user sets the "adjustment using actually printed material" button 6012 to ON and selects the next button 6013 on the saddle stitching adjustment procedure screen 6011 illustrated in FIG. 6A. When the next button 6013 is selected, a printed material source selection screen 6051 illustrated in FIG. 6C is displayed on the display unit 103. The user selects the source of a sheet that has already been printed and to be subjected to adjustment, using a fed sheet selection button 6052, and selects a next button 6053.

When the next button 6053 is selected, a printed material folding position displacement amount input screen 6071 illustrated in FIG. 6D is displayed on the display unit 103. The screen is basically the same as the test chart folding position displacement amount input screen 6061 illustrated in FIG. 6D, but is different in that states 6072, 6073, and 6074 of the folding position are expressed for the actually printed material, and not for the test chart. The user inputs a displacement amount 6075 of the folding position by selecting the folding position state 6072, 6073, 6074 and by using a +/− button 6076, and selects an OK button 6077.

When the OK button 6077 is selected, a printed material stapling position displacement amount input screen 6091 illustrated in FIG. 6E is displayed on the display unit 103. This screen is also basically the same as the test chart stapling position displacement amount input screen 6081 illustrated in FIG. 6E, but is different in that states 6092, 6093, and 6094 of the stapling position are expressed for the actually printed material, and not for the test chart. The user inputs a stapling position displacement amount 6095 by selecting the state 6092, 6093, 6094 of the stapling position and by using a +/− button 6096, and selects an OK button 6097. When the user selects the OK button 6097, the test chart re-output confirmation screen 6101 illustrated in FIG. 6F is displayed on the display unit 103. The subsequent screen transition is similar to that in the case of the saddle stitching adjustment using a test chart, and the description thereof will be omitted. Cancel buttons 6014, 6054, and 6078 on the respective screens are used for canceling the adjustment before the completion. The screen transition in the case of the saddle stitching adjustment using the actually printed material is as described above.

Folding Adjustment Using Test Chart/Actually Printed Material

Next, the screen transition in a case of the folding adjustment using the test chart and the folding adjustment using the actually printed material will be described. Basically, the transition is the same as that in the cases of the saddle stitching adjustment using the test charts and the saddle stitching using the actually printed material. Therefore, only the difference between the folding adjustment and the saddle stitching adjustment will be described. For the folding adjustment, adjustment for the stapling position as in the saddle stitching adjustment is not required. Thus, as the screen for the folding adjustment procedure, the folding adjustment procedure screen 6021 illustrated in FIG. 6B is displayed on the display unit 103 instead of the saddle stitching adjustment procedure screen 6011 illustrated in FIG. 6A. The only difference is the difference in the description of the adjustment procedure. Since the stapling position adjustment is not required, the test chart re-output confirmation screen 6101 illustrated in FIG. 6D is displayed on the display unit 103 after the test chart folding position displacement amount input screen 6061 illustrated in FIG. 6D or the printed material folding position displacement amount input screen 6071 illustrated in FIG. 6F is displayed. The difference between the folding adjustment and the saddle stitching adjustment is as described above.

Adjustment Procedure for Post Processing

Figure 7A:
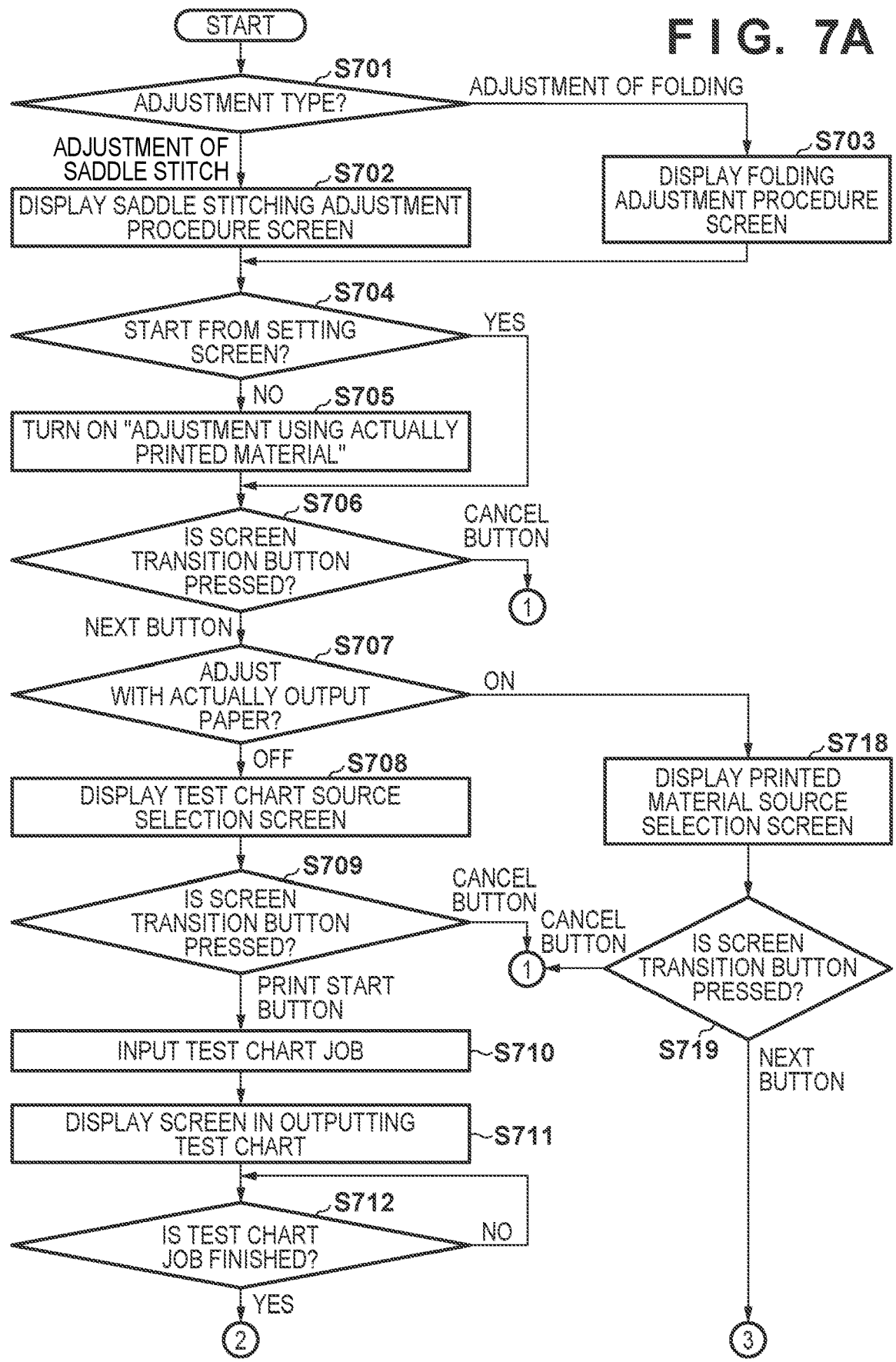
FIG. 7A is a flowchart illustrating an adjustment procedure for post processing.
Figure 7B:
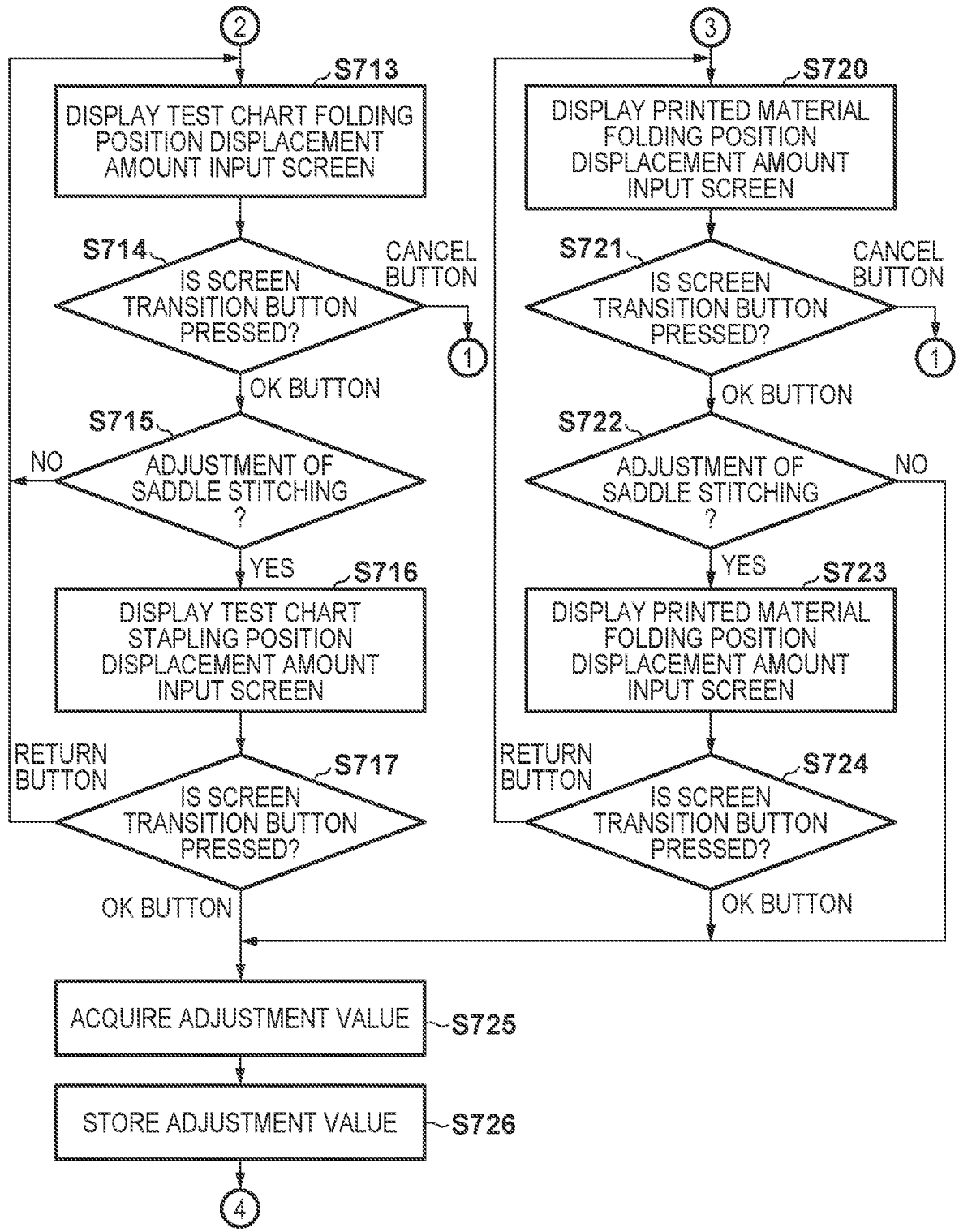
FIGS. 7B-7C are flowcharts illustrating an adjustment procedure for post processing.
Figure 7C:
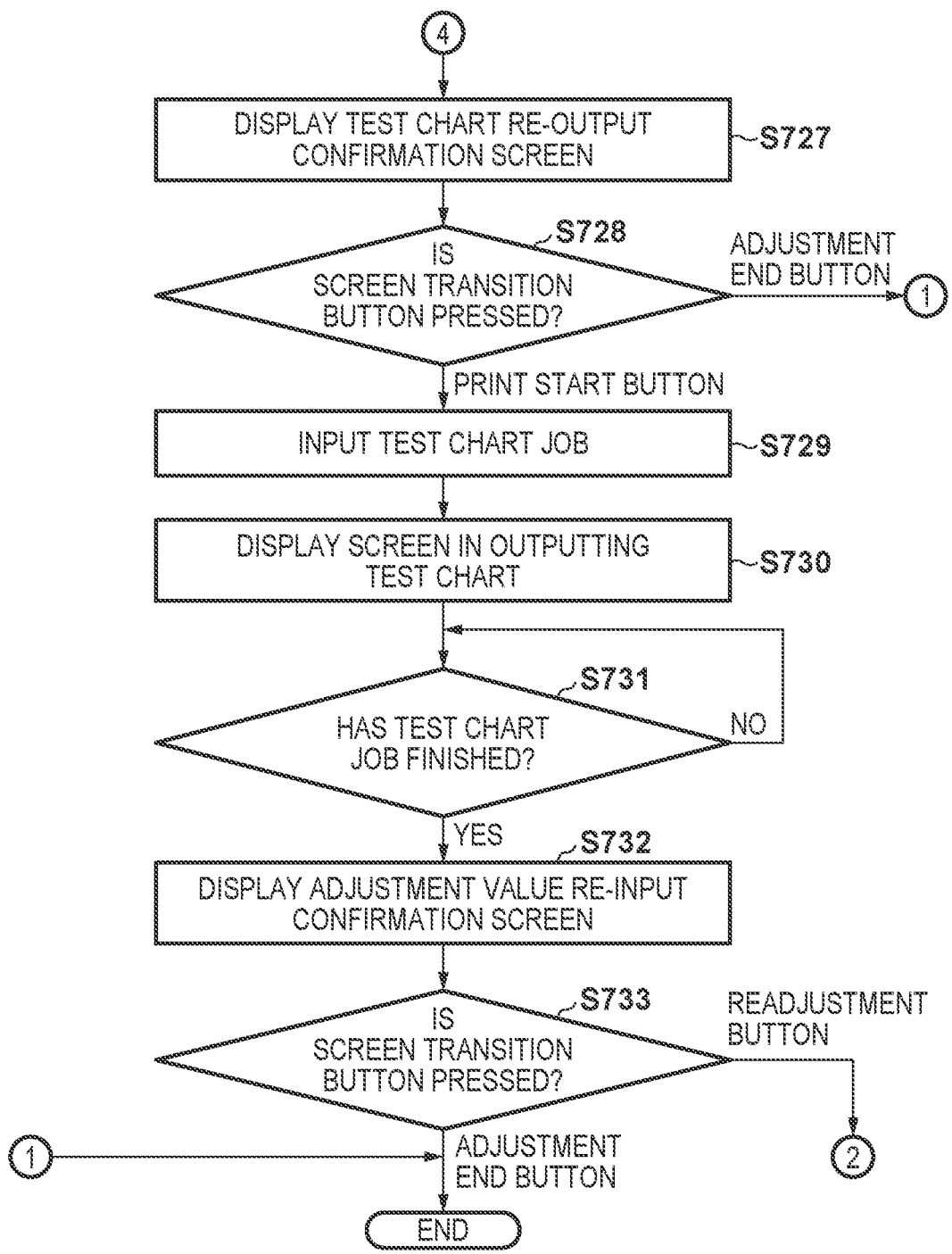

Next, an adjustment procedure for the post processing according to the present embodiment will be described with reference to FIG. 7A to FIG. 7C. The processing described below is executed, for example, by the CPU 108 loading a control program stored in the ROM 109, the HDD 111, and the EEPROM 112 onto the RAM 110 and executing it. The processing starts when the folding position/stapling position adjustment button 433, the folding position adjustment button 446, the "saddle stitching-folding position/stapling position adjustment" button 6002, or the "folding position adjustment" button 6003 is selected.

First, the CPU 108 determines the type of adjustment in S701. Specifically, when the adjustment starts using the folding position/stapling position adjustment button 433 or the "saddle stitching-folding position/stapling position adjustment" button 6002 on the saddle stitching setting screen 431, the CPU 108 determines that the adjustment is for the saddle stitching. On the other hand, when the adjustment starts using the folding position adjustment button 446 or the "folding position adjustment" button 6003 on the folding setting screen 441, the CPU 108 determines that the adjustment is for the folding. When the adjustment for the saddle stitching is determined, the processing proceeds to S702, where the CPU 108 displays the saddle stitching adjustment procedure screen 6011 illustrated in FIG. 6A on the display unit 103. Then, the processing proceeds to S704. When the adjustment for the folding is determined, the processing proceeds to S703, where the CPU 108 displays the folding adjustment procedure screen 6021 illustrated in FIG. 6B on the display unit 103. Then, the processing proceeds to S704. At the timing when the screen is displayed in S702 or S703, the "adjustment using actually printed material" button 6012 or 6022 is OFF. In order to simplify the description, two settings are exemplified herein, but another setting may be included. In that case, the processing proceeds to screen control and processing corresponding to the setting.

In S704, the CPU 108 determines whether the adjustment has started from the setting menu screen 6001. When is determined that the adjustment has started from the setting menu screen 6001, the processing proceeds to S706. When it is determined that the adjustment has started from a screen other than the setting menu screen 6001, the processing proceeds to S705. Here, the screen other than the setting menu screen 6001 is, for example, the saddle stitching setting screen 431 or the folding setting screen 441. In S705, the CPU 108 changes the default display for the "adjustment using actually printed material" button (object) 6012 or 6022 to ON, and the processing proceeds to S706. As a result, when the adjustment starts from the setting menu screen 6001 (first start unit), the default display for the "adjustment using actually printed material" button 6012 or 6022 is OFF. On the other hand, when the adjustment starts from the saddle stitching setting screen 431 or the folding setting screen 441 (second start unit), the default display for the "adjustment using actually printed material" button 6012 or 6022 is ON. In the case of adjustment from the saddle stitching setting screen 431 or the folding setting screen 441, since a start instruction is issued in a setting sequence of a job (for example, a copy job or the like), there is a possibility that a printed material has already been output. Thus, the default display is set to ON. Here, as an example of the first start unit and the second start unit, the button for starting the adjustment processing arranged on the various setting screens has been described. Alternatively, in the present invention, the first start unit and the second start unit may be configured in such a manner that the start instruction for the adjustment processing is issued when a button provided in the operation unit 104 is operated, instead of the start instruction for the adjustment processing being issued when the button arranged on the screen is operated. In this case, when the button is operated, the determination may be made based on whether the sequence of the setting menu of the image forming apparatus is in progress (first start unit) or whether the setting of the job including the post processing is in progress (second start unit). Instead of determining which of the start units is used for issuing the start instruction, a screen before transition to an adjustment screen displayed to be described later may be determined for switching a default setting to display an object. The screen before the transition includes the setting menu screen 6001, the saddle stitching setting screen 431, or the folding setting screen 441 for example.

Next, in S706, the CPU 108 accepts selection of the next button 6013, 6023 or the cancel button 6014, 6024 on the operation unit 104. When it is determined that the cancel button 6014, 6024 is selected, the processing of this flowchart ends. When it is determined that the next button 6013, 6023 is selected, the processing proceeds to S707. In S707, the CPU 108 determines a predetermined setting status, that is, whether the value of the "adjustment using actually printed material" button 6012 or 6022 is ON or OFF. When it is determined to be OFF, the processing proceeds to adjustment using the test chart in and after S708. On the other hand, when it is determined to be ON, the processing proceeds to adjustment using an actually printed material in and after S718.

First, in the adjustment using the test chart in and after S708, the CPU 108 displays the source selection screen 6031 illustrated in FIG. 6B on the display unit 103. Then, in S709, the CPU 108 determines whether the print start button 6033 or the cancel button 6034 is selected. When it is determined that the cancel button 6034 is selected, the processing of this flowchart ends. On the other hand, when it is determined that the print start button 6033 is selected, the processing proceeds to S710, where the CPU 108 instructs the printer unit 105 to print a test chart and instructs the finisher unit 106 to perform post processing on the printed test chart. Specifically, in the case of a saddle stitching test chart, A/B is printed on two sheets as illustrated in 301 and 302, and saddle stitching processing is further performed as post processing. Then the test chart is output. In the case of a folding test chart, A/B is printed on one sheet as illustrated in 303 and 304, and folding processing is further performed. Then, the test chart is output. During the outputting of the test chart, in S711, the CPU 108 displays the test chart outputting screen 6041 illustrated in FIG. 6C on the display unit 103, and waits until it is determined that the outputting has finished in S712. While the test chart outputting screen 6041 is being displayed on the display unit 103, the printer unit 105 prints the test chart, and then the finisher unit 106 performs the saddle stitching processing or the folding processing as the post processing on the printed test chart.

After the test chart has been output, the processing proceeds to S713, where the CPU 108 displays the folding position displacement amount input screen 6061 illustrated in FIG. 6D on the display unit 103 and accepts the input of the state of the folding position and the displacement amount a. The user checks the output test chart, checks the displacement of the folding position or the stapling position, and inputs the displacement amount to the input screen 6061. Whether the OK button 6067 or the cancel button 6068 is selected is determined in S714. When it is determined that the cancel button 6068 is selected, the processing of this flowchart ends. When the OK button 6067 is selected, the processing proceeds to S715. In S715, the CPU 108 determines whether the current adjustment is for the saddle stitching. When the adjustment is not for the saddle stitching, the stapling position needs not to be adjusted, and thus the processing proceeds to S723. On the other hand, when the adjustment is for the saddle stitching, the processing proceeds to S716, where the CPU 108 displays the stapling position displacement amount input screen 6081 illustrated in FIG. 6E on the display unit 103, and accepts the inputs of the stapling position state and the displacement amount b. Whether the OK button 6087 or the return button 6088 is selected is determined in S717. When it is determined that the return button 6088 is selected, the processing returns to S713. On the other hand, when it is determined that the OK button 6087 is selected, the processing proceeds to S723.

The processing up to this point is the method of inputting the displacement amount using the test chart.

Next, a description will be given on a method of inputting a displacement amount using an actually printed material in and after S718. In S718, the CPU 108 displays the source selection screen 6051 illustrated in FIG. 6C on the display unit 103. Whether the next button 6053 or the cancel button 6054 is selected is determined in S719. When it is determined that the cancel button 6054 is selected, the processing of this flowchart ends. When it is determined that the next button 6053 is selected, the processing proceeds to S720, where the CPU 108 displays the folding position displacement amount input screen 6071 illustrated in FIG. 6D on the display unit 103 and accepts the input of the state of the folding position and the displacement amount a. Then, in S721, the CPU 108 determines whether the OK button 6077 or the cancel button 6078 is selected. When it is determined that the cancel button 6078 is selected, the processing of this flowchart ends. As described above, according to the present embodiment, the display content on the adjustment screen is switched depending on whether the test chart used in the adjustment processing needs to be printed. In particular, when the test chart is to be output, a display for instructing the output, the outputting screen 6041, and the like are displayed, whereas when the test chart is not to be output, the displaying of these is omitted.

On the other hand, when it is determined that the OK button 6077 is selected, the processing proceeds to S722. In S722, the CPU 108 determines whether the current adjustment is for the saddle stitching. When the adjustment is not for the saddle stitching, the stapling position needs not to be adjusted, and thus the processing proceeds to S724. When the adjustment is for the saddle stitching, the processing proceeds to S723, where the CPU 108 displays the stapling position displacement amount input screen 6091 illustrated in FIG. 6E on the display unit 103, and accepts the inputs of the stapling position state and the displacement amount b. In S724, the CPU 108 determines whether the OK button 6097 or the return button 6098 is selected. When it is determined that the return button 6098 is selected, the processing returns to S720. On the other hand, when it is determined that the OK button 6097 is selected, the processing proceeds to S725. The processing up to this point is the method of inputting the displacement amount using the actually printed material.

In the present embodiment, the adjustment using the test chart and the adjustment using the actually printed material are different from each other in the displacement amount input screen displayed, that is, the input screen 6061 and 6071 for the former, and the input screens 6081 and 6091 for the latter. However, this is not intended to limit the present invention, and the screens displayed may be the same. In this case, the flows of inputting the displacement amount in and after S712 or in and after S719 may be integrated into one flow.

Next, in S725, the CPU 108 acquires an adjustment value. Specifically, the CPU 108 adds the displacement amount a to the adjustment value for the folding position stored in the EEPROM 112, and adds the displacement amount b to the adjustment value for the stapling position. Then, in S726, the CPU 108 stores the values as a result of the addition in the EEPROM 112. In S727, the CPU 108 displays the test chart re-output confirmation screen 6101 illustrated in FIG. 6F on the display unit 103. In S728, the CPU 108 determines whether the adjustment end button 6102 or the print start button 6103 is selected. When it is determined that the adjustment end button 6102 is selected, the processing of this flowchart ends.

On the other hand, when it is determined that the print start button 6103 is selected, the processing proceeds to S729, where the CPU 108 instructs the printer unit 105 to print a test chart and instructs the finisher unit 106 to perform post processing on the test chart as in S710. Then, in S730, the CPU 108 displays the test chart outputting screen 6041 illustrated in FIG. 6C on the display unit 103, as in S711. While the test chart outputting screen 6041 is being displayed on the display unit 103, the printer unit 105 prints the test chart, and then the finisher unit 106 performs the saddle stitching processing or the folding processing as the post processing on the printed test chart. Then, in S731, the CPU 108 waits until the outputting is finished.

When the test chart output ends, the processing proceeds to S732, where the CPU 108 displays the adjustment value re-input confirmation screen 6111 illustrated in FIG. 6F on the display unit 103. Then, in S733, the CPU 108 determines whether the adjustment end button 6112 or the readjustment button 6113 is selected. When it is determined that the adjustment end button 6112 is selected, the processing of this flowchart ends. On the other hand, when it is determined that the readjustment button 6113 is selected, the processing returns to S713. The procedure described above is the processing procedure for the adjustment processing.

As described above, the image forming apparatus according to the present embodiment determines whether a test chart used in adjustment processing related to post processing needs to be printed, in accordance with a predetermined setting status. Upon determining that the test chart needs to be printed, the image forming apparatus prints and performs the post processing on the test chart, and executes the adjustment processing using the test chart output. Upon determining that the test chart needs not to be printed, the image forming apparatus executes the adjustment processing using a printed material that has already been printed and subjected to the post processing. As described above, according to the present embodiment, by switching between cases where the test chart is to be and not to be output depending on whether there is a printed material that can be used in the adjustment for the post processing, the adjustment can be performed without wasteful printing of the test chart.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present invention is not limited to the above embodiments and various changes and modifications can be made within the spirit and scope of the present invention. Therefore, to apprise the public of the scope of the present invention, the following claims are made.

According to the present invention, when adjustment is performed for post processing on a printed material, a printed material for the adjustment can be suitably output as necessary, and output of an unnecessary printed material can be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-171583, filed Oct. 26, 2022, which is hereby incorporated by reference herein in its entirety.

What is claimed is:

1. An image forming apparatus comprising:
   at least one memory device that stores a set of instructions; and
   at least one processor that executes the set of instructions to:
   determine whether printing of a test chart used in adjustment processing related to post processing is necessary in accordance with a predetermined setting status; and
   execute the adjustment processing using the test chart output as a result of printing and the post processing on the test chart in a case where the printing of the test chart is determined to be necessary, and execute the adjustment processing using a printed material that has already been printed and subjected to the post processing, in a case where the printing of the test chart is determined to be unnecessary.

2. The image forming apparatus according to claim 1, wherein the at least one processor executes instructions in the memory device to:
   display a setting screen on a display unit;
   accept a start instruction of the adjustment processing related to the post processing on the setting screen; and
   display an adjustment screen to perform the adjustment processing on the display unit in a case where the start instruction is accepted on the setting screen, wherein
   the adjustment screen includes an object used to set whether the printing of the test chart used in the adjustment processing is necessary.

3. The image forming apparatus according to claim 2, wherein the at least one processor executes instructions in the memory device to:
   display, on a display unit, a first screen used to issue the start instruction; and
   display, on the display unit, a second screen used to issue the start instruction through an operation different from an operation on the first screen; and
   switch and display a default setting when displaying the object on the adjustment screen according to which of the first screen and the second screen has been used to issue the start instruction.

4. The image forming apparatus according to claim 3, wherein
   the first screen is used to issue the start instruction in a sequence of a setting menu of the image forming apparatus, and
   the second screen is used to issue the start instruction in setting of a job including the post processing.

5. The image forming apparatus according to claim 4, wherein the at least one processor executes instructions in the memory device to:
   display the object with a default setting requiring the test chart used in the adjustment processing to be printed in a case where the start instruction is issued using the first screen, and display the object with a default setting not requiring the test chart used in the adjustment processing to be printed in a case where the start instruction is issued using the second screen.

6. The image forming apparatus according to claim 2, wherein the at least one processor executes instructions in the memory device to:
   display the object on the adjustment screen with default setting for displaying the object switched in accordance with a screen before transition to the adjustment screen displayed.

7. The image forming apparatus according to claim 6, wherein the at least one processor executes instructions in the memory device to:
   display the object with default setting requiring the test chart used in the adjustment processing to be printed in a case where the screen before the transition is a screen displayed in a setting menu of the image forming apparatus, and display the object with default setting not requiring the test chart used in the adjustment processing to be printed in a case where the screen before the transition is not a screen displayed in a setting menu of the image forming apparatus.

8. The image forming apparatus according to claim 7, wherein the screen before the transition not being a screen displayed in the setting menu is a screen on which a job setting including the post processing is made.

9. The image forming apparatus according to claim 2, wherein the at least one processor executes instructions in the memory device to: switch a content displayed on the adjustment screen depending on whether the printing of the test chart used in the adjustment processing is necessary.

10. The image forming apparatus according to claim 9, wherein the at least one processor executes instructions in the memory device to: display a screen indicating that the test chart is being output, as one type of the adjustment screen, in a case where the printing of the test chart used in the adjustment processing is necessary.

11. The image forming apparatus according to claim 2, wherein the at least one processor executes instructions in the memory device to: acquire an adjustment value for a position where the post processing is performed on a printed material through the adjustment screen, and store the adjustment value in a storage unit.

12. The image forming apparatus according to claim 11, wherein the at least one processor executes instructions in the memory device to: perform the post processing after adjusting the position where the post processing is performed on a printed material, based on the adjustment value stored in the memory device.

13. The image forming apparatus according to claim 12, wherein
the post processing is saddle stitching processing or folding processing, and
the position where the post processing is performed on a printed material is a folding position and a stapling position in the saddle stitching processing or is a folding position in the folding processing.

14. The image forming apparatus according to claim 12, wherein the at least one processor executes instructions in the memory device to: include, in the adjustment screen, an object used to issue an instruction for re-outputting the test chart, based on the adjustment value stored in the storage unit.

15. A control method for an image forming apparatus, the control method comprising:
determining whether printing of a test chart used in adjustment processing related to post processing is necessary in accordance with a predetermined setting status; and
executing the adjustment processing using the test chart output as a result of printing and the post processing on the test chart in a case where the printing of the test chart is determined to be necessary, and executing the adjustment processing using a printed material that has already been printed and subjected to the post processing, in a case where the printing of the test chart is determined to be unnecessary.

16. A non-transitory computer-readable storage medium storing a computer program for causing a computer to execute each step of a control method for an image forming apparatus, the control method comprising:
determining whether printing of a test chart used in adjustment processing related to post processing is necessary in accordance with a predetermined setting status; and
executing the adjustment processing using the test chart output as a result of printing and the post processing on the test chart in a case where the printing of the test chart is determined to be necessary, and executing the adjustment processing using a printed material that has already been printed and subjected to the post processing, in a case where the printing of the test chart is determined to be unnecessary.

* * * * *